United States Patent [19]

Hutter

[11] 4,316,770
[45] Feb. 23, 1982

[54] LIQUID-METAL-COOLED REACTOR

[75] Inventor: Ernest Hutter, Wilmette, Ill.

[73] Assignee: The United States of America as represented by the Department of Energy, Washington, D.C.

[21] Appl. No.: 77,821

[22] Filed: Sep. 21, 1979

[51] Int. Cl.³ .............................................. G21C 1/02
[52] U.S. Cl. .................................. 376/175; 376/352; 376/364
[58] Field of Search ................ 176/18, 40, 50, 61, 176/64, 65

[56] References Cited

U.S. PATENT DOCUMENTS

| | | | |
|---|---|---|---|
| 3,215,606 | 11/1965 | Silvester | 176/61 |
| 3,296,085 | 1/1967 | Peck et al. | 176/40 |
| 3,386,885 | 6/1968 | Wright | 176/40 |
| 3,398,050 | 8/1968 | Yevick et al. | 176/61 |
| 3,486,973 | 12/1969 | Georges et al. | 176/18 |
| 3,549,493 | 12/1970 | Germer | 176/61 |
| 4,050,985 | 9/1977 | Yant et al. | 176/40 |

FOREIGN PATENT DOCUMENTS 2747419  4/1979  Fed. Rep. of Germany ........ 176/40
54-130788 10/1979 Japan ........................................ 176/50

OTHER PUBLICATIONS

ANL-76-61-An Overview of Pool Type LMFBR's (5/76), pp. 1-298.

*Primary Examiner*—Sal Cangialosi
*Attorney, Agent, or Firm*—Frank H. Jackson; Judson Hightower; James E. Denny

[57] ABSTRACT

A perforated depressor plate extending across the bottom of the instrument tree of a fast breeder reactor cooperates with a circular cylindrical metal bellows forming a part of the upper adapter of each core assembly and bearing on the bottom of the depressor plate to restrict flow of coolant between core assemblies, thereby reducing significantly the pressure differential between the coolant inside the core assemblies and the coolant outside of the core assemblies. Openings in the depressor plate are slightly smaller than the top of the upper adapter so the depressor plate will serve as a backup mechanical holddown for the core. In addition coolant mixing devices and locating devices are provided attached to the depressor plate.

4 Claims, 3 Drawing Figures

LIQUID-METAL-COOLED REACTOR

CONTRACTUAL ORIGIN OF THE INVENTION

The invention described herein was made in the course of, or under, a contract with the UNITED STATES DEPARTMENT OF ENERGY.

BACKGROUND OF THE INVENTION

This invention relates in general to liquid-metal-cooled nuclear reactors and more particularly to an improvement in such a reactor whereby the pressure differential between the inside and outside of core assembly ducts is reduced. The invention also relates to a modified core assembly upper adapter capable of obtaining this result and to the combination therewith of a modified instrument tree.

A nuclear reactor includes a reactor vessel into which a heat transfer fluid, typically liquid sodium for fast breeder reactors, is pumped under pressure. The fluid flows through the core and is heated; the hot fluid emerges from the vessel and flows through mechanically separated primary and secondary loops to electrical power generation equipment. Within the vessel there is supporting structure for the core components which typically include fuel rod bundles or assemblies, control rod assemblies, blanket fertile material or fertile rod assemblies and removable radial shielding assemblies.

The structure within the vessel above the core provides secondary holddown of the reactor core assemblies for the contingency that gravity and hydraulic holddowns fail (during emergencies such as control rod scram), and also supports control rod drive channels and instrumentation. Also this structure may be designed to promote mixing of cooling fluid emerging from different core components which may operate at different temperatures. This structure above the core may be called upper-core support structure, upper internal structure, upper internals or an instrument tree. All of these terms are conventional in the art. In this application the term instrument tree will be used.

Typically, in a fast breeder reactor, a substantial pressure difference exists between the inside and the outside of the ducts enclosing the core assemblies. Accordingly core assembly duct walls of substantial thickness are required. Reasons for reducing the duct wall thickness include:

The decreased mass of structural material increases the fuel volume fraction and may decrease the reactor diameter.

The decreased mass of structural material also decreases the parasitic neutron absorptions and thus improves breeding performance.

Hexagonal ducts with heavy walls are more costly than those with thinner walls (within limits).

Internal pressure within the core assembly duct is determined by the fuel assembly pressure drop caused by the coolant flow velocity and no significant reduction can be counted on. If the pressure differential is to be decreased, it must be by increasing the pressure on the outside of the ducts. Clearly, increasing the bypass flow to increase the pressure between ducts would not represent a satisfactory solution of the problem since efficiency of the reactor would thereby be reduced. Other solutions to the problem have been developed but these are not compatible with conventional fuel handling equipment and procedures employing rotating plugs and push-pull vertical in-core fuel handling machines.

It is an object of the present invention to reduce the pressure differential between the inside and outside of core assembly ducts in a fast breeder reactor.

It is a more detailed object of the present invention to increase the interassembly coolant pressure in a fast breeder reactor.

It is also an object of the present invention to provide an instrument tree for a fast breeder reactor which provides back-up mechanical holddown for the core assemblies while allowing for thermal or radiation-induced growth of core components.

It is a further object of the present invention to provide an instrument tree for a fast breeder reactor which, in addition to the above, provides mixing of coolant emerging from the core assemblies.

It is a still further object of the present invention to provide a instrument tree as described which incorporates core assembly positioning elements.

A basic object of the present invention is to achieve the above objects without interfering with well-established core assembly handling methods so that conventional rotating plugs and push-pull vertical in-core fuel-handling machines can still be used for fuel assembly loading and unloading.

It is also an object of the present invention to provide metal-to-metal contact at the corners of core assemblies, leaving the center open for coolant flow.

SUMMARY OF THE INVENTION

According to the present invention, a stiff, but somewhat flexible metal bellows becomes a part of each fuel assembly upper adapter. The bellows matches a round opening in a perforated depressor plate which extends across the bottom of the instrument tree the entire width of the reactor. Openings in the depressor plate are slightly smaller than the top of the upper adapter. During reactor operations, the depressor plate rests on the bellows compressing them slightly, the bellows having enough compression space left to allow for thermal or radiation induced growth of the core assemblies. The depressor plate will provide backup mechanical holddown for the core assemblies should it be required. In addition, locating devices and coolant mixing devices are provided attached to the depressor plate.

DESCRIPTION OF THE PREFERRED EMBODIMENT

Figure 1:
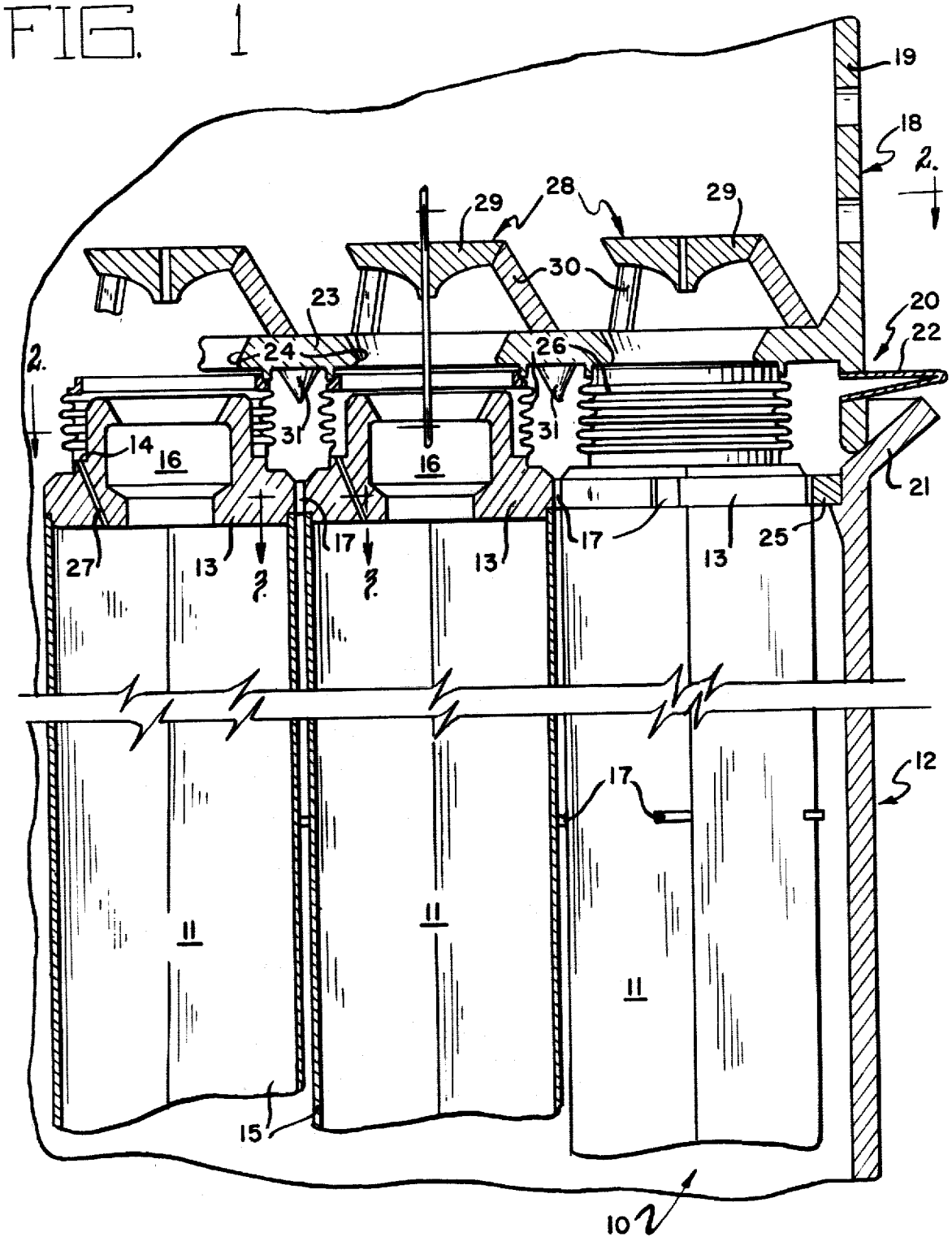
FIG. 1 is a diagrammatic partial vertical section showing the interface between a nuclear reactor core and an instrument tree therefore illustrating the present invention.
Figure 2:
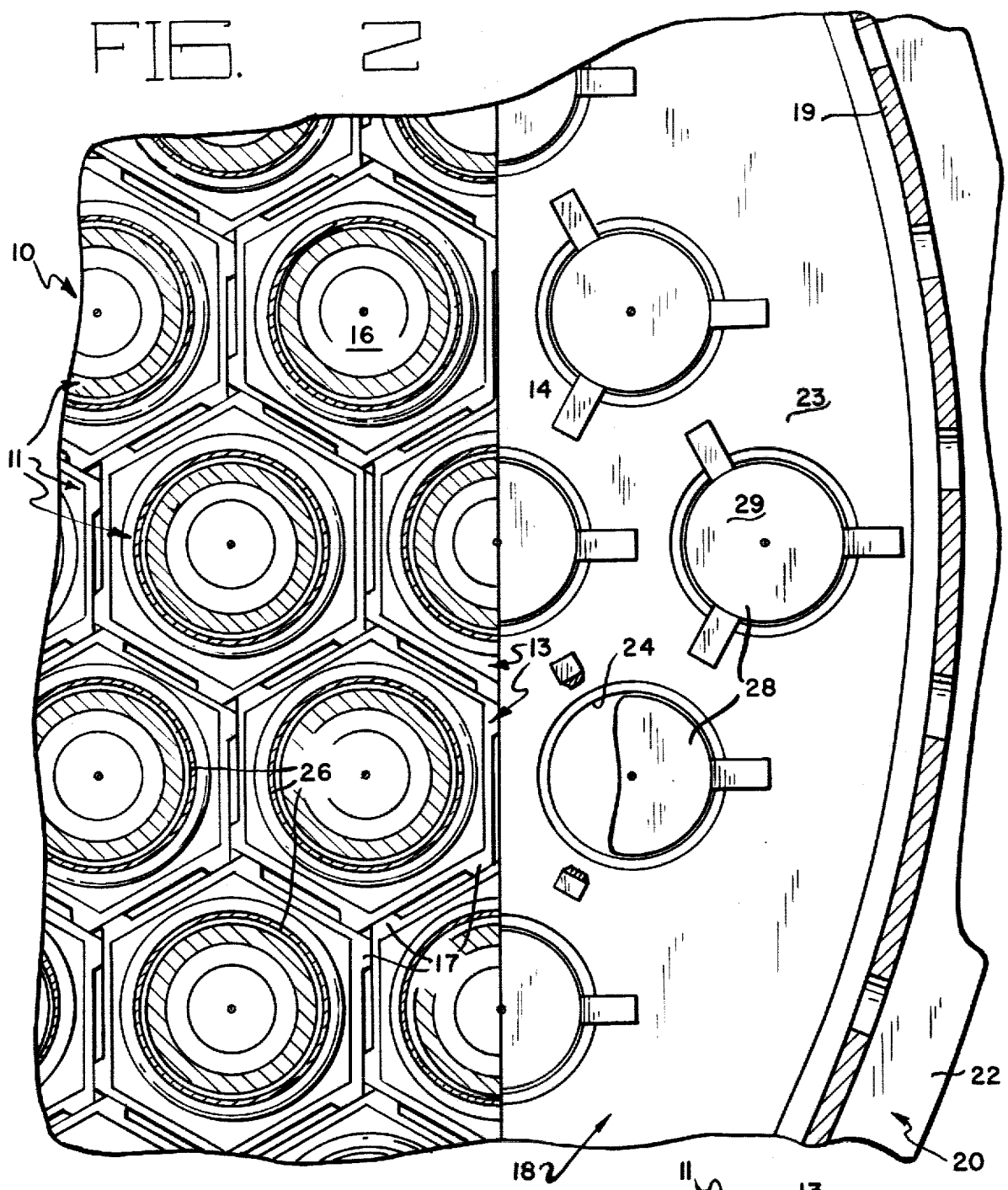
FIG. 2 is a diagrammatic, enlarged, partial section taken in the direction of the arrows 2—2 in FIG. 1.

As shown in the drawing a nuclear reactor comprises a core 10 including a plurality of vertically disposed, hexagonal core assemblies 11 enclosed within a reactor barrel 12. Each core assembly 11 includes an upper adapter 13 having a shoulder 14 therein between a top portion of lesser diameter and a bottom portion of greater diameter. Core assemblies 11 as is conventional in the art are enclosed within hexagonal ducts 15. Each upper adapter has a coolant exit port 16 extending vertically therethrough.

Figure 3:
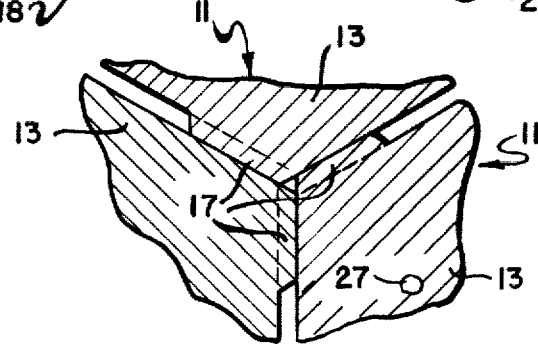
FIG. 3 is a detailed horizontal section taken on the line 3—3 in FIG. 1.

The flat surfaces of adjacent hexagonal ducts 15 are about 0.250 inches apart to accommodate thermal horizontal expansion and flux induced swelling. To counteract seismic tremors, support pads 17 at the corners of the core assemblies—see in particular FIG. 3—provide virtual metal-to-metal contact (restraint) at the elevation of the adapters 13 and at several other elevations the length of the assemblies. Each core assembly has six such pads thereon at each elevation symmetrically disposed at the corners of the assemblies. Thus pads 17 on adjacent assemblies are complementary and metal-to-metal contact between adjacent assemblies is made only near the corners of the hexagonal ducts, clearance being left near the center portion of the hexagonal duct flat where bulging is most likely to occur. The spacer pads can be integral with the upper adapter but should be a separate piece fastened to the hexagonal duct at other elevations.

Disposed above the core 10 is an instrument tree 18 including an outer perforated structural shroud 19 fastened to its top to the rotating plug and connected to the reactor barrel 12 by a circumferential seat 20. Circumferential seat 20 includes a circumferential guide member 21 and a one-leaf bellows 22 which together ensure that the instrument tree 18 will be properly seated on the core barrel 12. A depressor plate 23 having openings 24 therein aligned with the centerlines of core assemblies 11 and of a size slightly less than the top of upper adapter 13 extends across the bottom of shroud 19. As is conventional in the art, a filler ring 25 conforming in shape to the exterior of the core fills the space between the top of the core and the reactor barrel.

Metal bellows 26 constitute a very important part of the present invention. These constitute a part of upper adapters 13 extending from shoulders 14 thereof to match the openings 24 in depressor plate 23. Bellows 26 are welded to shoulder 14 and press against depressor plate 23 to engage depressor plate 23 closely without necessarily being sealed thereto. It will be apparent that there will be some leakage of coolant between bellows 26 and depressor plate 23 but this will be insufficient to reduce the pressure of the interassembly coolant such that the benefits of the present invention would not be attained. Drain holes 27 are provided in the upper adapters 13 to drain the area of the upper adapters behind the bellows 26. During reactor operation, depressor plate 23 rests on the bellows 26, depressing them slightly, and on the reactor barrel circumferential seat 20. Each bellows has enough compression space left to allow for thermal or radiation induced growth of the core assembly.

It will be noted that the metal bellows 26 will resist upward movement of the core assemblies 11 while the depressor plate 23 specifically and the instrument tree 18 in general will prevent upward movement of the core component more than the distance between the top of adapter 13 and the bottom of depressor plate 23 since openings 24 in the depressor plate are smaller than the diameter of the upper portions of adapter 13.

In addition bellows 26 restricts the flow of coolant through the space between core assemblies increasing the coolant pressure therein to reduce the difference in pressure between the interassembly coolant and the inassembly coolant. Much thinner-walled ducts than are required in conventional practice may thereby be employed. Duct wall thickness may thereby be reduced from about 0.150" to about 0.040".

Above and centered on the core assemblies 11 are flow diverters 28 consisting of generally conical baffles 29 connected to depressor plate 23 by thin rods 30 to provide little resistance to flow while directing coolant emerging from each core assemby to the side where it mixes with coolant emerging from adjacent core assemblies.

On the bottom of depressor plate 23 centered over the intersection of three adjacent core assemblies 11 are conical guides 31. These serve as guides to ensure proper registration of the instrument tree and core assemblies.

The opening in the depressor plate, located directly below the fuel-handling mechanism shaft, will be large enough to provide clearance for the vertical movement of a core assembly through the depressor plate. (Reactor loading and unloading.) During reactor operation, the enlarged opening will be blocked by the lower end of the fuel-handling mechanism shaft or by an inserted device replacing the shaft.

The embodiments of the invention in which an exclusive property or privilege is claimed are defined as follows:

1. In a liquid-metal-cooled fast-breeder nuclear reactor incorporating a core consisting of a plurality of vertically disposed core assemblies enclosed within a hexagonal coolant duct and including an upper adapter, said core being surmounted by an instrument tree, the improvement comprising a perforated depressor plate extending across the bottom of the instrument tree the entire width of the core, the perforations therein being centered on the centerline of the core assemblies and being of a size slightly less than the top of the upper adapter and a circular cylindrical metal bellows attached to each upper adapter matching each perforation in the depressor plate and bearing on the depressor plate to restrict the flow of coolant upwardly between core assemblies, thereby increasing the interassembly coolant and thus decreasing significantly the pressure difference between the inside and outside of the core assembly hexagonal ducts.

2. The improvement of claim 1 further including generally conical flow diverters attached to the top of the depressor plate centered above each perforation in the depressor plate to mix coolant coming from adjacent core assemblies.

3. The improvement of claim 1 and further including conical guides on the bottom of the depressor plate centered on the intersection of the three adjacent core assemblies.

4. The improvement of claim 1 and further including six pads symmetrically disposed around each core assembly at each of several elevations, the pads on adjacent core assemblies being complementary, to permit metal-to-metal contact at the corners of the core assemblies, the center of the faces of the assemblies being open for coolant flow.

* * * * *